United States Patent
Tatsuka (10) Patent No.: US 9,294,783 B2
(45) Date of Patent: Mar. 22, 2016

(54) IMAGE ENCODING DEVICE

(71) Applicant: MegaChips Corporation, Osaka-shi (JP)

(72) Inventor: Toshimitsu Tatsuka, Osaka (JP)

(73) Assignee: MegaChips Corporation, Osaka-shi (JP)

(*) Notice: Subject to any disclaimer, the term of this patent is extended or adjusted under 35 U.S.C. 154(b) by 0 days.

(21) Appl. No.: 14/387,388

(22) PCT Filed: Jan. 15, 2013

(86) PCT No.: PCT/JP2013/050571
§ 371 (c)(1),
(2) Date: Sep. 23, 2014

(87) PCT Pub. No.: WO2013/140833
PCT Pub. Date: Sep. 26, 2013

(65) Prior Publication Data
US 2015/0063470 A1 Mar. 5, 2015

(30) Foreign Application Priority Data
Mar. 23, 2012 (JP) ................. 2012-067446

(51) Int. Cl.
*H04N 19/65* (2014.01)
*H04N 19/91* (2014.01)
*H04N 19/124* (2014.01)
*H04N 19/176* (2014.01)
*H04N 19/132* (2014.01)
*H04N 19/167* (2014.01)

(52) U.S. Cl.
CPC ............. *H04N 19/65* (2014.11); *H04N 19/124* (2014.11); *H04N 19/132* (2014.11); *H04N 19/167* (2014.11); *H04N 19/176* (2014.11); *H04N 19/91* (2014.11)

(58) Field of Classification Search
CPC .... H04N 19/176; H04N 19/65; H04N 19/124
See application file for complete search history.

(56) References Cited

U.S. PATENT DOCUMENTS

2009/0074073 A1* 3/2009 Srinivasan ............. H04N 19/51
375/240.16
2009/0245664 A1 10/2009 Matsumoto et al.

FOREIGN PATENT DOCUMENTS

| JP | 10 42295 | 2/1998 |
|---|---|---|
| JP | 2000 333180 | 11/2000 |
| JP | 2001 36908 | 2/2001 |
| JP | 2009 239565 | 10/2009 |

OTHER PUBLICATIONS

International Search Report Issued Apr. 23, 2013 in PCT/JP13/050571 Filed Jan. 15, 2013.

* cited by examiner

*Primary Examiner* — Joseph Ustaris
*Assistant Examiner* — Zhubing Ren
(74) *Attorney, Agent, or Firm* — Oblon, McClelland, Maier & Neustadt, L.L.P.

(57) ABSTRACT

In an image encoding device, a variable-length encoder encodes a quantized macro blocks and generates encoded data. The variable-length encoder forcefully encodes an end macro block of a line group composed of macro block lines, as a non-skipped macro block. Each of macro blocks which are to be encoded subsequent to the end macro block is encoded as a non-skipped macro block until an amount of codes of the encoded data including the end macro block reaches the smallest unit of transmission of the transmission part. As a result, the encoded data including the end macro block is transmitted to the image decoding device by the smallest unit of transmission.

5 Claims, 5 Drawing Sheets

IMAGE ENCODING DEVICE

TECHNICAL FIELD

The present invention relates to an image encoding device using a skipped macro block in encoding uncompressed image data.

BACKGROUND ART

Under encoding standards of moving-image data such as H.264, MPEG2 and the like, a macro block which satisfies a predetermined condition can be encoded as a skipped macro block (which will hereinafter be referred to as a "skipped MB"). The predetermined condition is that all of quantization values of a macro block take on zero when a predictive motion vector is used. In a case where a macro block is encoded as a skipped MB, encoded data of the macro block is not generated. An image decoding device uses data in a source of reference of the predictive motion vector in decoding the skipped MB. The use of a skipped MB can improve efficiency in encoding moving-image data.

However, in some cases, in order to decrease power consumption or reduce delay, encoded moving-image data is decoded with a method other than well-known methods. In such cases, if moving-image data is encoded with the use of a skipped MB, an error may probably be caused when the encoded moving-image data is decoded. In view of this, Patent Documents 1 and 2 describes techniques of inhibiting encoding of a specific macro block as a skipped MB.

Patent Document 1 describes an image encoding device which divides a picture into a plurality of parallel processed areas, and encodes the plurality of parallel processed areas in parallel with the use of a plurality of encoding elements. Each of the encoding elements deters generation of a skipped MB in a leading macro block of each of the parallel processed areas. As a result of this, when one encoding element encodes one parallel processing area, it can prevent from referring to the quantization parameter in the other parallel processing area without a need to divide a picture into a plurality of slices.

Patent Document 2 describes techniques of dividing a picture into more than one slice to encode the picture. When the first macro block or the last macro block of each of the slices is encoded as a skipped MB, the first macro block or the last macro block which is encoded as a skipped MB is forcefully changed in type into a non-skipped MB.

Patent Document 1: Japanese Patent Application Publication No. 2009-239565

Patent Document 2: Japanese Patent Application Publication No. 2000-333180

The image encoding device according to Patent Document 1 divides a picture into a plurality of parallel processed areas and encodes the plurality of parallel processed areas in parallel, to thereby enhance processing performance with low power consumption. By using a structure of the image encoding device according to Patent Document 1, it is possible to shorten a time required for encoding of a picture. However, the image encoding device according to Patent Document 1 needs to include a plurality of encoding elements, which complicates the structure.

DISCLOSURE OF INVENTION

An image encoding device according to the present invention includes: a quantization unit configured to quantize uncompressed image data on which frequency conversion is carried out for each macro block, and generating a quantized macro block; an encoder for encoding the quantized macro block, and generating encoded data; and an output unit configured to sequentially output the encoded data generated by the encoder, wherein, the encoder includes: a first setting unit configured to set any one of macro blocks including an end macro block of a first macro block line which is composed of horizontally-arranged macro blocks and a predetermined number of macro blocks which are successively encoded after the end macro block, as a first non-skipped macro block; and a second setting unit configured to set each of macro blocks which are successively encoded after the first non-skipped macro block as a second non-skipped macro block until an amount of codes of encoded data including the first non-skipped macro block which is encoded by the encoder becomes equal to or larger than the smallest unit of output by which the output unit is able to output encoded data, and the output unit outputs first encoded data including the first non-skipped macro block by the smallest unit of output.

According to the present invention, it is possible to prevent non-skipped macro blocks from occurring successively from the end macro block without limitation, so that delay caused in association with encoding of the first macro block line can be reduced.

In view of the foregoing problems, an object of the present invention is to provide an image encoding device which can reduce delay in encoding moving-image data without a need for a complicated structure.

These and other objects, features, aspects and advantages of the present invention will become more apparent from the following detailed description of the present invention when taken in conjunction with the accompanying drawings.

BEST MODE FOR CARRYING OUT THE INVENTION

Below, a preferred embodiment of the present invention will be described with reference to accompanying drawings.

<1. Structure of Image Transmission System>

Figure 1:
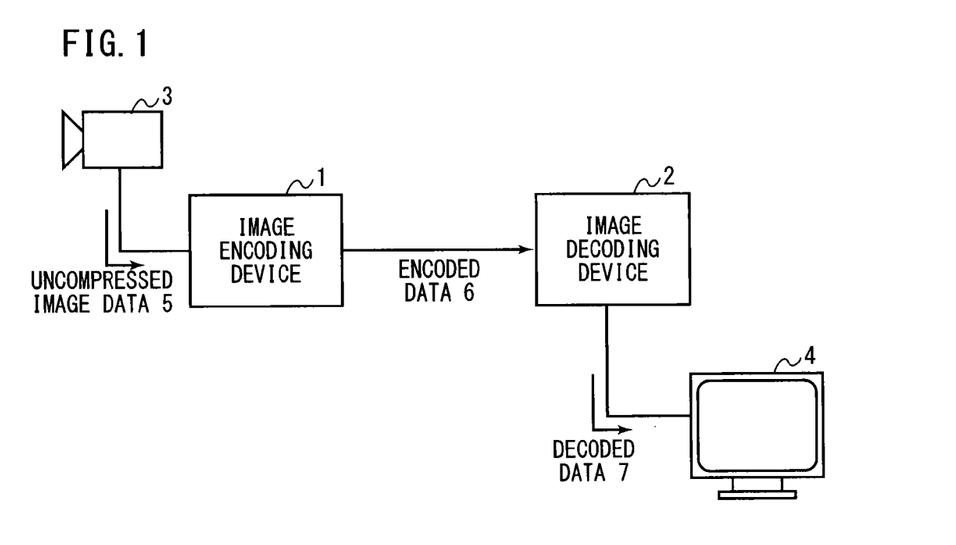
FIG. 1 is a functional block diagram showing a structure of an image transmission system according to a preferred embodiment of the present invention.

FIG. 1 is a functional block diagram showing an image transmission system according to a preferred embodiment. The image transmission system shown in FIG. 1 includes an image encoding device 1, an image decoding device 2, a camera 3, and a monitor 4.

The camera 3 shoots a subject, and generates uncompressed image data 5. The uncompressed image data 5 is moving-image data, and is input to the image encoding device 1 frame by frame. The image encoding device 1 encodes the uncompressed image data 5 in accordance with the H.264 standard, to generate encoded data 6. The encoded data 6 is transmitted to the image decoding device 2 by wireless communication. The image decoding device 2 decodes the transmitted encoded data 6, to generate video data 7. The monitor 4 displays the video data 7 generated by the image decoding device 2.

The image transmission system shown in FIG. 1 is a monitoring system, for example, and displays a picture shot by the camera 3 on the monitor 4 in real time. The image encoding device 1 and the camera 3 are placed at an ATM (Automated Teller Machine) corner of a financial institution, or the like. The image decoding device 2 and the monitor 4 are placed in a monitoring room. In order to monitor the ATM corner in real time, it is required for the image transmission system to allow for minimization of a time it takes for a picture shot by the camera 3 to be displayed on the monitor 4.

Additionally, the image transmission system show in FIG. 1 can be used for delivery of video, for which short delay is required. In this case, the uncompressed image data 5 need not be generated by the camera 3. For example, the image encoding device 1 may deliver video contents. To this end, the image decoding device 1 can memorize the video contents (uncompressed image data 5), and generate the encoded data 6 from the uncompressed image data 5 as required by a client.

<2. Structure of Image Encoding Device>

Figure 2:
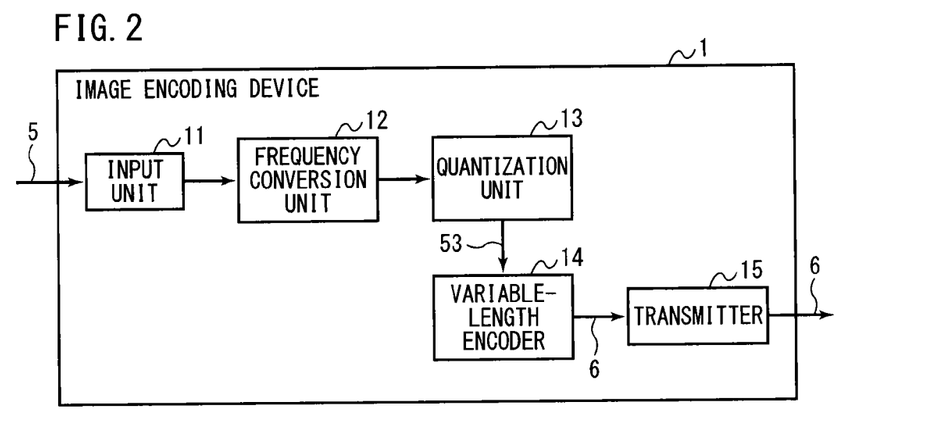
FIG. 2 is a functional block diagram showing a structure of an image encoding device shown in FIG. 1.

FIG. 2 is a functional block diagram showing a structure of the image encoding device 1. As shown in FIG. 2, the image encoding device 1 includes an input unit 11, a frequency conversion unit 12, a quantization unit 13, a variable-length encoder 14, and a transmitter 15.

The input unit 11 receives the uncompressed image data 5 which is generated by the camera 3 frame by frame. The frequency conversion unit 12 carries out frequency conversion on a frame of the uncompressed image data 5 for each macro block. The quantization unit 13 quantizes the macro block on which frequency conversion has been carried out, and generates a quantized macro block 53. The variable-length encoder 14 carries out entropy encoding on the quantized macro block 53, and generates the encoded data 6. The transmitter 15 divides the encoded data 6 and transmits it to the image decoding device 2. For transmission of the encoded data 6, wireless local area network (LAN) is employed, for example.

Figure 3:
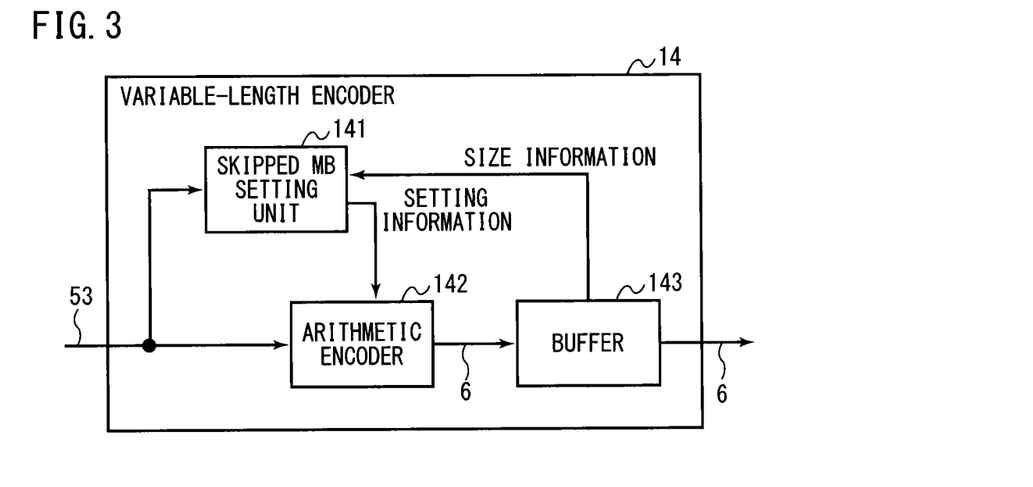
FIG. 3 is a functional block diagram showing a structure of a variable-length encoder shown in FIG. 2.

FIG. 3 is a functional block diagram showing a structure of the variable-length encoder 14. As shown in FIG. 3, the variable-length encoder 14 includes a skipped MB setting unit 141, an arithmetic encoder 142, and a buffer 143.

The skipped MB setting unit 141 determines whether or not the quantized macro block 53 should be forcefully set as a non-skipped MB. In other words, the skipped MB setting unit 141 determines whether or not encoding of the quantized macro block 53 as a non-skipped MB is permitted.

In a case where the quantized macro block 53 is set as a non-skipped MB by the skipped MB setting unit 141, the arithmetic encoder 142 encodes the quantized macro block 53 with the use of a context-based adaptive binary arithmetic code (CABAC) or the like, to generate the encoded data 6.

The arithmetic encoder 142 can encode the quantized macro block 53 as a skipped MB when encoding with the use of a skipped MB is permitted. The arithmetic encoder 142 determines whether or not the quantized macro block 53 should be encoded as a skipped MB based on a quantization value of the quantized macro block 53 or the like. More specifically, the arithmetic encoder 142 encodes the quantized macro block 53 as a skipped MB on condition that all of quantization values of the quantized macro block 53 take on zero because of use of a predictive motion vector of the quantized macro block 53. The quantized macro block 53 is encoded as a non-skipped MB in a case where the foregoing condition is not satisfied. In such a case, the arithmetic encoder 142 encodes the quantized macro block 53 by using normal procedures.

The buffer 143 temporally stores the encoded data 6 generated by the arithmetic encoder 142.

<3. Structure of Image Decoding Device 2>

Figure 4:
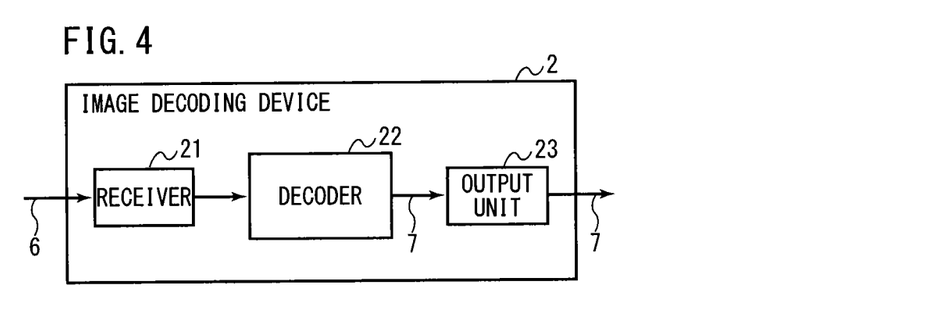
FIG. 4 is a functional block diagram showing a structure of an image decoding device shown in FIG. 1.

FIG. 4 is a functional block diagram showing a structure of the image decoding device 2. As shown in FIG. 4, the image decoding device 2 includes a receiver 21, a decoder 22, and an output unit 23. The receiver 21 receives the encoded data 6 which is divided. The decoder 22 sequentially decodes the encoded data 6 received by the receiver 21, and generates the video data 7. The output unit 23 outputs the video data 7 which is generated by the decoder 22, to the monitor 4.

<4. Overview of Operations of Image Transmission System>

Below, overview of operations of the image transmission system will be provided with reference to FIGS. 5 and 6.

Figure 5:
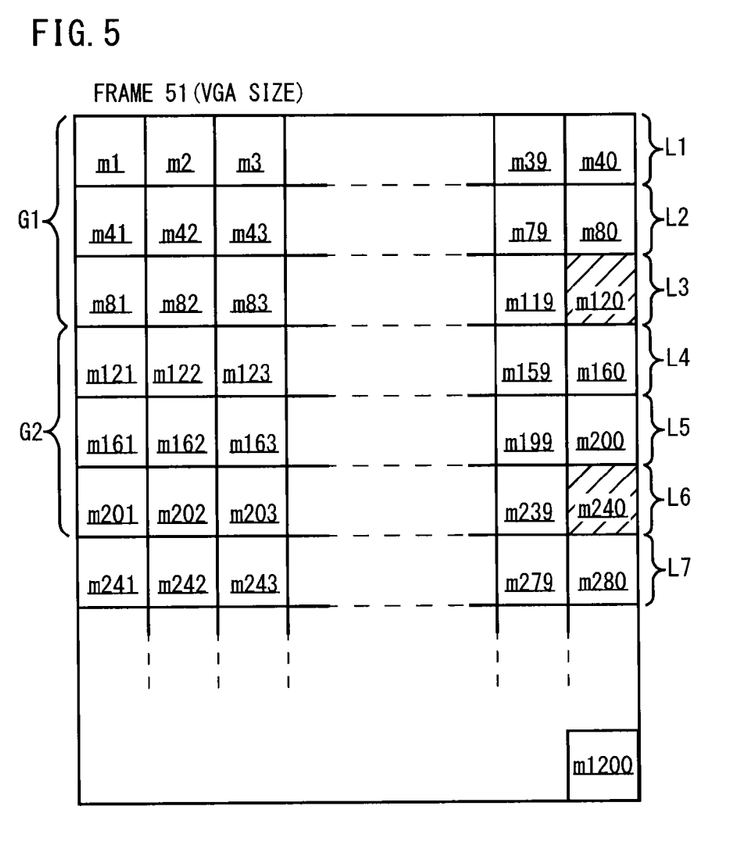
FIG. 5 shows a frame which is encoded by the image encoding device shown in FIG. 1.

FIG. 5 is a schematic view showing a structure of a frame 51 of the uncompressed image data 5. In FIG. 5, illustration of some of macro blocks is omitted. The frame 51 is divided into a plurality of macro blocks, and encoded as a predictive (P) picture. The number of slices included in the frame 51 is one. Additionally, in a case where the frame 51 is encoded as an I picture, the frame 51 is encoded by using the same procedures as the conventional procedures.

The size of a macro block is 16 pixels high by 16 pixels wide. In a case where the frame 51 has a VGA (video graphics array) size of 640 pixels vertical by 480 pixels horizontal, forty macro blocks are arranged in a horizontal (lateral) direction and thirty macro blocks are arranged in a vertical (longitudinal) direction.

According to the preferred embodiment, the forty macro blocks arranged in a horizontal direction will be referred to as a macro block line. Then, a plurality of successive macro block lines will be referred to as a line group. For example, macro block lines L1, L2, and L3 compose a line group G1. Macro block lines L4, L5, and L6 compose a line group G2.

Figure 6:
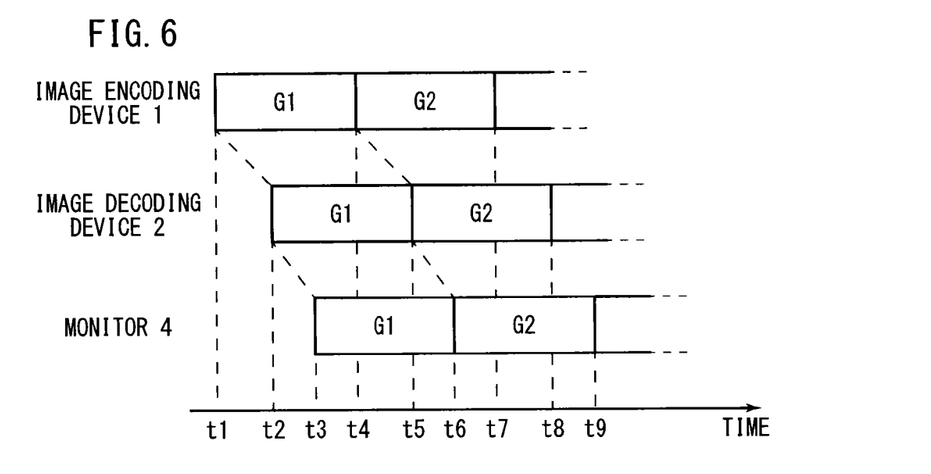
FIG. 6 is a sequence diagram showing times when the image encoding device, the image decoding device, and a monitor which are shown in FIG. 1, respectively perform processes.

FIG. 6 is a timing diagram showing a time required for each of line groups to be encoded by the image encoding device 1, a time required for each of line groups to be decoded by the image decoding device 2, and a time required for the monitor 4 to start to display each of line groups.

As shown in FIG. 6, it is assumed that a skipped MB does not successively occur from the line group G1 through the line group G2, in time when the line groups G1 and G2 are encoded by the image encoding device 1. That is, there is a possibility that times t4 and t7 at which respective processes for encoding the line groups G1 and G2 are finished will change depending on occurrence or non-occurrence of a skipped MB. Then, along with the change in the time t4, a time t5 at which the image decoding device 2 starts to decode the line group G2 may also be probably changed.

Also, a period during which a line group is displayed on the monitor 4 is fixed. In other words, the monitor 4 carries out a process for displaying the line group G1 from the time t3 to time t6, and carries out a process for displaying the line group G2 from the time t6 to time t9, irrespective of changes in the times t4, t5, and t7.

The image encoding device 1 encodes the line group G1 and sequentially transmits encoded macro blocks to the image decoding device 2 during a period from the time t1 to the time t4. The image encoding device 1 encodes the line group G2 and sequentially transmits encoded macro blocks to the image decoding device 2 during a period from the time t4 to the time t7.

The image decoding device 2 starts to decode the encoded line group G1 at the time t2, and starts to decode the encoded line group G2 at the time t5. The image decoding device 2 sequentially outputs decoded macro blocks (the video data 7) to the monitor 4. The monitor 4 starts to display the video data 7 of the line group G1 at the time t3, and starts to display the video data 7 of the line group G2 at the time t6.

In the above-described manner, the image encoding device 1 sequentially transmits encoded macro blocks to the image decoding device 2, so that the image decoding device 2 can start to decode the macro blocks as received. Accordingly, a period from a time at which the image encoding device 1 starts to encode the frame 51 to a time at which the monitor 4 starts to display the video data 7 can be shortened.

<5. Problems Presented when Skipped MBs Successively Occur>

The image encoding device 1 sequentially transmits encoded macro blocks to the image decoding device 2 as described above. However, if occurrence of skipped MB is permitted without limitation, a situation where the monitor 4 cannot display a part of macro blocks will arise.

For example, let us assume that macro blocks m81 through m199 are encoded as skipped MBs and macro blocks m80 and m200 are encoded as non-skipped MBs. In this case, the encoded data 6 indicating that "the macro blocks m81 through m199 are skipped MBs" is generated after it is determined that the macro block m200 is encoded as a non-skipped MB. The time t4 at which encoding of the line group G1 is finished is delayed, so that a situation where the image decoding device 2 cannot decode the macro block m81 by the time t6 (refer to FIG. 6) at which the monitor 4 finishes a process for displaying the line group G1 will arise. As a result, the monitor 4 cannot display the video data 7 of the macro block m81.

As described above, if encoding of each of macro blocks as a skipped MB is permitted without limitation, an error in display will probably occur. In order to avoid occurrence of such problem, the variable-length encoder 14 carries out a skipped MB limiting process. The skipped MB limiting process is a process of forcefully encoding a part of macro blocks as non-skipped MBs. Below, details thereof will be provided.

<6. Skipped MB Limiting Process>

First, overview of a skipped MB limiting process which is carried out by the variable-length encoder 14 will be provided. The following description will be made on the assumption that each of macro blocks of the frame 51 shown in FIG. 5 is a quantized macro block.

The variable-length encoder 14 forcefully encodes the quantized macro block 53 as a non-skipped MB when the quantized macro block 53 is an end macro block (which will hereinafter be referred to as a "end MB") of a line group. As a result of this, delay of timing for encoding the end MB can be prevented. In the frame 51 shown in FIG. 5, macro blocks m120 and m240 which are shown by using hatching correspond to end MBs. That is, a macro block located at a right end of every third macro block line is set as a non-skipped MB.

The variable-length encoder 14 forcefully encodes each of subsequent macro blocks (which will be hereinafter referred to as "subsequent MBs") which are to be encoded next to the end MB, as non-skipped MBs. For example, macro blocks m121, m122, m123, correspond to subsequent MBs. The end MBs and the subsequent MBs which are encoded as non-skipped MBs are stored in the buffers 143 as the encoded data 6.

After the encoded data 6 including the end MBs are stored in the buffer 143, the transmitter 15 transmits the encoded data 6 stored in the buffer 143 to the image decoding device 2 when an amount of codes of the encoded data 6 stored in the buffer 143 reaches the smallest unit of transmission (eight bits). An amount of codes of a non-skipped MB is larger than an amount of codes of a skipped MB. By encoding the subsequent MBs as non-skipped MBs, it is possible to shorten a period during which the encoded data 6 including the end MBs is stored in the buffer 143.

If the buffer 143 does not hold the encoded data 6 of an end MB, the transmitter 15 transmits the encoded data 6 having an amount of codes which is larger than the smallest unit of transmission. More specifically, the transmitter 15 transmits the encoded data 6 stored in the buffer 143 when an amount of codes of the encoded data 6 stored in the buffer 143 exceeds a predetermined threshold value. The threshold value is an integral multiple of the smallest unit of transmission (equal to or larger than double of the smallest unit of transmission).

As described above, the image encoding device 1 forcefully encodes an end MB of a line group as a non-skipped MB, and encodes subsequent MBs as non-skipped MBs until an amount of codes of the encoded data 6 including an end MB reaches the smallest unit of transmission. As a result of this, the image encoding device 1 can reduce delay caused in association with encoding of the frame 51 without a need to encode a plurality of line groups in parallel.

Also, to encode an end MB of a line group as a non-skipped MB prevents skipped MBs from occurring successively from one to another line group. Accordingly, delay caused in association with encoding of the whole of line group can be reduced.

<7. Operations of Variable-Length Encoder 14>

Figure 7:
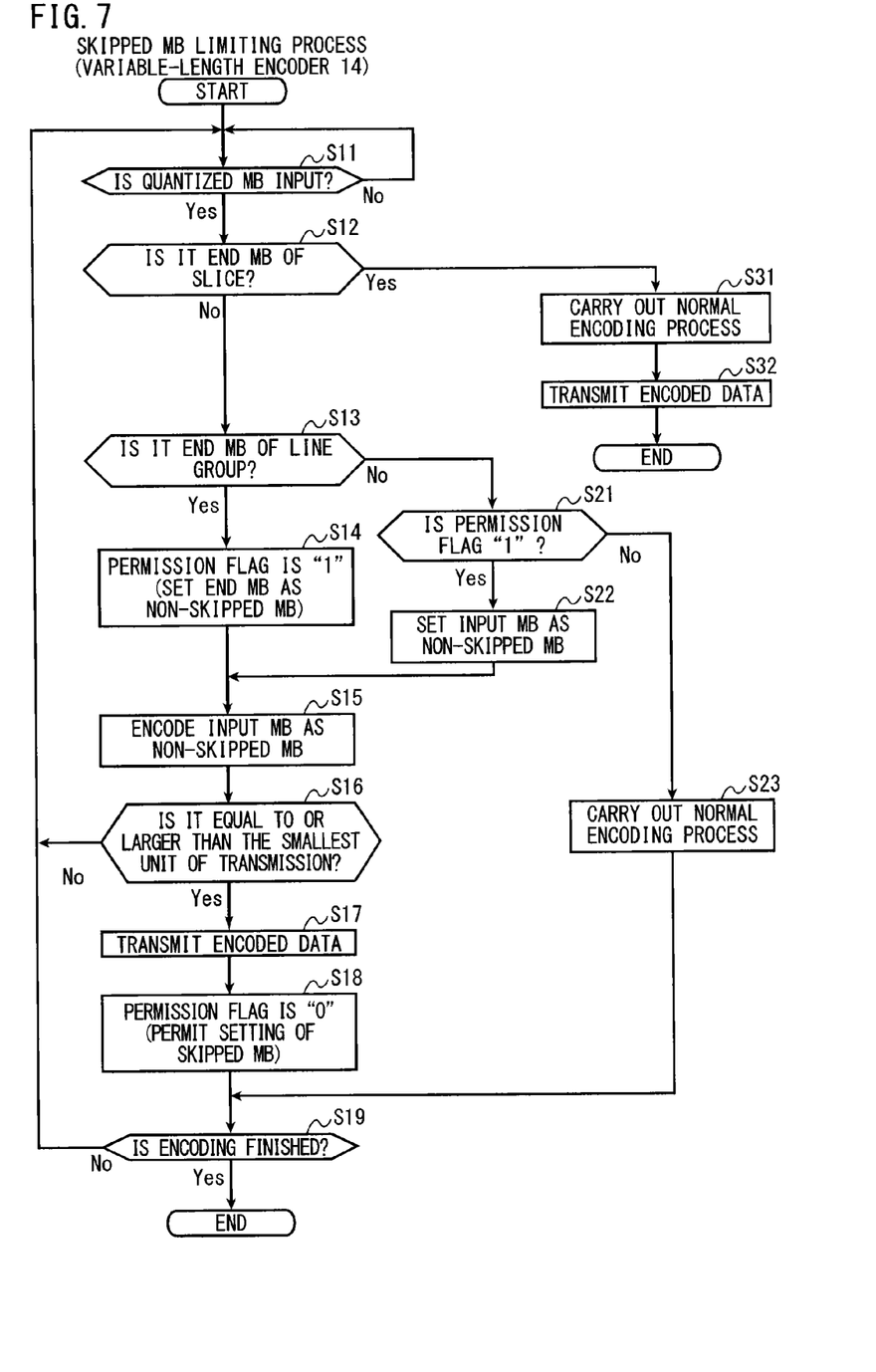
FIG. 7 is a flow chart showing operations of the variable-length encoder shown in FIG. 2.

FIG. 7 is a flow chart showing operations of the variable-length encoder 14. Below, the operations of the variable-length encoder 14 will be described in detail with reference to FIG. 7.

In an initial state, it is assumed that a permission flag is set to "0" in the skipped MB setting unit 141. The permission flag is information indicating whether or not encoding of the input quantized macro block 53 as a skipped MB should be permitted. When a permission flag is "0", the arithmetic encoder 142 can encode the quantized macro block 53 as a skipped MB. When a permission flag is "1", the arithmetic encoder 142 cannot encode the quantized macro block 53 as a skipped MB.

(Case where the Quantized Macro Block 53 is not an End MB)

The variable-length encoder 14 receives a macro block m1 ("Yes" in step S11). The skipped MB setting unit 141 determines whether or not the macro block m1 is an end MB of a slice (step S12). Since the macro block m1 is located at a head of the frame 51 as shown in FIG. 5 ("No" in step S12), the skipped MB setting unit 141 determines whether or not the macro block m1 is an end MB of a line group (step S13). The skipped MB setting unit 141 determines that the macro block m1 is not an end MB of the line group G1 ("No" in step S13), and checks whether or not a permission flag is "1" (step S21).

Since the permission flag is "0" ("No" in step S21), the skipped MB setting unit 141 notifies the arithmetic encoder 142 that the macro block m1 can be encoded as a skipped MB. The arithmetic encoder 142 carries out a normal encoding process on the macro block m1 (step S23). Then, the flow returns back to the step S11 because the variable-length encoder 14 does not finish encoding of the frame 51 ("No" in step S19).

Now, the step 23 will be described in more detail. In a case where an input macro block can be encoded as a skipped MB, the arithmetic encoder 142 determines an encoding mode based on a quantization value and a predictive motion vector of the input macro bock 53. The arithmetic encoder 142 encodes the macro block m1 as a skipped MB on condition that all of quantization values of the macro block m1 take on zero as a result of calculation of a predictive motion vector of the macro block m1. When the macro block m1 does not satisfy the foregoing condition, the macro block m1 is encoded as a non-skipped MB.

Additionally, in a case where a plurality of macro blocks are successively encoded as skipped MBs, the arithmetic encoder 142 generates the encoded data 6 which indicates that "successive N macro blocks are skipped MBs".

Though not shown in FIG. 7, the arithmetic encoder 142 stores the encoded data 6 of the macro block m1 into the buffer 143 after the step S23. When the buffer 143 does not hold the encoded data 6 including an end MB and an amount of codes of the encoded data 6 stored in the buffer 143 exceeds a threshold value, the transmitter 15 retrieves the encoded data 6 by an amount corresponding to the threshold value from the buffer 143. The transmitter 15 outputs the retrieved encoded data 6 to the image decoding device 2. In a case where the buffer 143 does not hold the encoded data 6 of an end MB, the transmitter 15 transmits the encoded data 6 of a size larger than the smallest unit of transmission, so that the encoded data 6 can be efficiently transmitted.

Thereafter, when the quantized macro blocks 53 except an end MB are input while a permission flag is "0", the variable-length encoder 14 carries out a normal encoding process on each of those quantized macro blocks 53 (step S23). In this case, each of the quantized macro blocks 53 is encoded as either a skipped MB or a non-skipped MB.

(Case where the Quantized Macro Block 53 is an End MB)
Next, when a macro block m120 is input ("Yes" in step S11), the variable-length encoder 14 determines that the macro block m120 is not an end MB of a slice ("No" in step S12). The variable-length encoder 14 determines that the macro block m120 is an end MB of the line group G1 ("No" in step S13). The skipped MB setting unit 141 changes a permission flag from "0" to "1" (step S14). That is, the macro bock m120 is set as a non-skipped MB, irrespective of whether or not the macro block m120 satisfies the condition for being encoded as a skipped MB.

The variable-length encoder 14 encodes the macro block m120 as a non-skipped MB (step S15), and stores the encoded data 6 of the macro block m120 into the buffer 143. Since the encoded data 6 stored in the buffer 143 includes the end MB which is encoded, the encoded data 6 is transmitted by the smallest unit of transmission. More specifically, when an amount of the encoded data 6 stored in the buffer 143 is equal to or larger than the smallest unit of transmission ("Yes" in step S16), the transmitter 15 transmits the encoded data 6 stored in the buffer 143 to the image decoding device 2 (step S17). Thus, the encoded data 6 is transmitted to the image decoding device 2 by the smallest unit of transmission. The encoded data 6 is cleared from the buffer 143. As a result of this, the encoded data 6 of the macro blocks m1 through m120 composing the line group G1 is transmitted to the image decoding device 2.

The skipped MB setting unit 141 changes the permission flag from "1" to "0" after the step S17 (step S18). This is because the image decoding device 2 can decode encoded data of the whole of the line group G1 by receiving the encoded data 6 of the macro block m120. As a result of the step S18, the image encoding device 1 can encode macro blocks which are to be encoded after the macro block m120, as skipped MBs.

On the other hand, an amount of codes of the encoded data 6 stored in the buffer 143 is equal to or smaller than the smallest unit of transmission (eight bits) ("No" in step S16), the transmitter 15 does not transmit the encoded data 6 stored in the buffer 143. At that time, the encoded data 6 of the macro block m120 is not transmitted to the image decoding device 2. The variable-length encoder 14 stands by until a next quantized macro block (macro block m121) is input (step S11).

Then, the variable-length encoder 14 receives the macro block m121 ("Yes" in step S11). At that time, the permission flag remains "1", and the buffer 143 holds the encoded data 6 having an amount of codes which is smaller than the smallest unit of transmission.

The macro block m121 is neither an end MB of a slice ("No" in step S12), nor an end MB of a line group ("No" in step S13). However, since the permission flag is "1" ("Yes" in step S21), the skipped MB setting unit 141 sets the macro block m121 as a non-skipped MB (step S22). The arithmetic encoder 142 encodes the macro block m121 as a non-skipped MB, based on setting made by the skipped MB setting unit 141 (step S15). The encoded data 6 of the macro block m121 is stored into the buffer 143.

When the amount of codes of the encoded data 6 stored in the buffer 143 is equal to or larger than the smallest unit of transmission ("Yes" in step S16), the transmitter 15 transmits the encoded data 6 including the macro blocks m120 and m121, to the image decoding device 2 (step S17). That is, the encoded data 6 is transmitted to the image decoding device 2 by the smallest unit of transmission. The skipped MB setting unit 141 changes the permission flag from "1" to "0" (step S18). The variable-length encoder 14 can encode each of input quantized macro blocks 53 as either a skipped MB or a non-skipped MB until an end MB (macro block m240) of the line group G2 is input.

Then, the flow returns back to the step S11 because the variable-length encoder 14 does not finish encoding of the frame 51 ("No" in step S19).

Additionally, there may occur an alternative case where an amount of codes of the encoded data 6 stored in the buffer 143 does not reach the smallest unit of transmission even after the encoded data 6 of the macro block m121 is stored into the buffer 143 ("No" in step S16). In this alternative case, the variable-length encoder 14 could encode each of a macro block m122 and macro blocks which are to be input after the macro block m122, as a non-skipped MB, until an amount of codes of the encoded data 6 stored in the buffer 143 reaches the smallest unit of transmission ("Yes" in step S16).

The variable-length encoder 14 receives a macro block m1200 of the frame 51 ("Yes" in step S11). The macro block m1200 is located at a tail end of the frame 51 and an end MB of a slice ("Yes" in step S12). Though the macro block m1200 is an end MB of a line group, the macro block m1200 is not forcefully encoded as a non-skipped MB. Thus, the variable-length encoder 14 carries out a normal encoding process (step S31), to thereby encode the macro block m1200 as either a skipped MB or a non-skipped MB (step S31). The step S31 includes processes similar to those included in the step S23. The encoded macro block m1200 is stored into the buffer 143. The encoded data 6 stored in the buffer 143 is transmitted to the image decoding device 2 even in a case where an amount of codes thereof does not reach the smallest unit of transmission (step S32).

As described above, the image encoding device 1 encodes an end MB as a non-skipped MB, and stores the encoded data 6 of the end MB into the buffer 143. The image encoding device 1 encodes each of subsequent macro blocks as a non-skipped MB until an amount of codes of the encoded data 6 stored in the buffer 143 reaches the smallest unit of transmission. An amount of codes of a non-skipped MB is larger than an amount of codes of a skipped MB, so that a time required for an amount of codes of the encoded data 6 stored in the buffer 143 to reach the smallest unit of transmission can be shortened. Therefore, delay caused in association with transmission of the encoded data 6 of an end MB can be reduced.

<8. Modifications>

Although an example in which forceful encoding of a macro block as a non-skipped MB is started from an end MB is cited in the above-described preferred embodiment, the present invention is not limited to that example. In the image encoding device 1, forceful encoding of a macro block as a non-skipped MB can be started from the K-th macro block, counting from an end MB. "K" is an integer equal to or larger than one.

When the smallest unit of transmission is "A" (bit), the maximum number of macro blocks which are necessary for generation of 1-bit encoded data 6 is "B", and the number of macro blocks which compose one macro block line is "X", "K" can be obtained by the following equation, <Equation 2>.

$$K=X-(A\times B)+1 \qquad \text{<Equation 2>}$$

Below, a method of calculating "K" in a case where the frame 51 of a VGA size is encoded in accordance with the standard of H.264 will be described.

Figure 8:
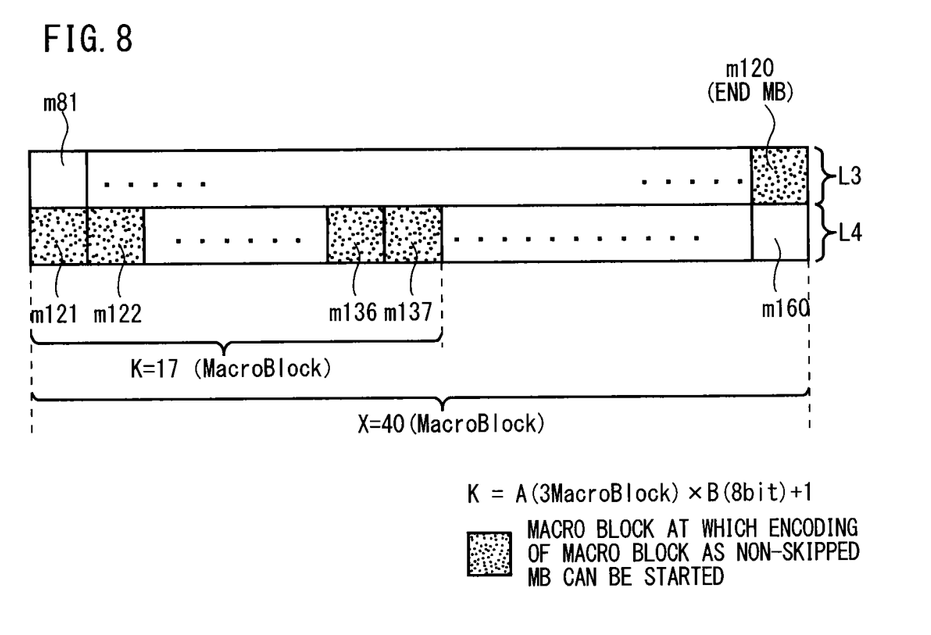
FIG. 8 shows a range of macro blocks at each of which encoding of a macro block as a non-skipped MB can be started, in the frame shown in FIG. 5.

FIG. 8 is a view showing a range of macro blocks at which encoding of a macro block as a non-skipped MB can be started in the case where the frame 51 has a VGA size. In FIG. 8, illustration of macro block lines except macro block lines L3 and L4 are omitted. Also, illustration of a part of macro blocks is omitted.

When the frame 51 of a VGA size (refer to FIG. 5) is a monotonous flat image, an amount of codes of the encoded data 6 of the whole of the frame 51 is the minimum.

Now, let us assume that such the frame 51 is to be arithmetically encoded with the use of CABAC. In this case, by encoding three successive macro blocks as non-skipped MBs, 1-bit encoded data 6 is generated. Hence, the maximum number of macro blocks (B) is three. Since the smallest unit of transmission (A) is eight bits and the number of macro blocks (X) is 40, the value of K can be calculated as "17" from the <Equation 2>.

Accordingly, in the example shown in FIG. 8, the image encoding device 1 can start to encode a macro block as a non-skipped MB from any one of macro blocks m120 through m137 which are illustrated like sandy areas in FIG. 8. In a case where encoding of a macro block as a non-skipped MB is started from the macro block m137, 1-bit encoded data 6 is generated every three macro blocks, at minimum. Therefore, the image encoding device 1 can generate the encoded data 6 corresponding to the smallest unit of transmission (8 bits) by encoding the macro blocks m137 through m160 as non-skipped MB. Delay in transmission of the encoded data 6 including an end MB (macro block m120) of the line group G1 can be reduced to a time required for encoding of one macro block line. As a result of this, the image decoding device 2 can decode the end MB (macro block m120) of the line group G1 by the time t6 at which the monitor 4 starts to display the line group G2.

Moreover, although an example in which three macro block lines compose one line group is cited in the above-described preferred embodiment, the present invention is not limited to that example. One line group may be composed of one or more macro block lines. In a case where a line group is composed of one macro block line, the last macro block of each of macro block lines is forcefully set as a non-skipped MB.

Furthermore, a part or a whole of the image encoding device according to the above-described preferred embodiment may be implemented as an integrated circuit (LSI, a system LSI, or the like, for example).

A part or a whole of processes of each of functional blocks according to the above-described preferred embodiment may be implemented by programs. Then, a part or a whole of processes of each of functional blocks according to the above-described preferred embodiment is carried out by a central processing unit (CPU) in a computer. Also, respective programs for carrying out the processes are stored in a memory such as a hard disk or a ROM, and are carried out in a ROM, or carried out after being read out by a RAM.

Also, each of the processes according to the above-described preferred embodiment may be implemented by hardware or software (including a case where each of the processes is implemented by an operating system (OS) or middleware, or implemented together with a predetermined library). Further, each of the processes may be implemented by mixed processing of software and hardware. Additionally, it is needless to say that adjustment of timing for carrying out each of the processes is necessary in a case where the image encoding device according to the above-described preferred embodiment is implemented by hardware. In the above-description of the preferred embodiment, details of adjustment of timing for various signals which are to be generated in actual design of hardware are omitted for convenience's sake of description.

While the invention has been shown and described in detail, the foregoing description is in all aspects illustrative and not restrictive. It is therefore understood that numerous modifications and variations can be devised without departing from the scope of the invention.

The invention claimed is:

1. An image encoding device, comprising:
   a quantization unit configured to quantize uncompressed image data on which frequency conversion is carried out for each macro block, and generating a quantized macro block;
   an encoder configured to encode the quantized macro block, and generating encoded data; and
   an output unit configured to sequentially output the encoded data generated by the encoder, wherein,
   the encoder includes:
   a first setting unit configured to set any one of macro blocks including an end macro block of a first macro block line which is composed of horizontally-arranged macro blocks and a predetermined number of macro blocks which are successively encoded after the end macro block, as a first non-skipped macro block; and
   a second setting unit configured to set each of macro blocks which are successively encoded after the first non-skipped macro block as a second non-skipped macro block until an amount of codes of encoded data including the first non-skipped macro block which is encoded by the encoder becomes equal to or larger than the smallest unit of output by which the output unit is able to output encoded data, and, the output unit outputs first encoded data including the first non-skipped macro block by the smallest unit of output.

2. The image encoding device according to claim 1, wherein when the output unit outputs second encoded data which does not include the first non-skipped macro block, the output unit outputs the second encoded data in a size larger than the smallest unit of output.

3. The image encoding device according to claim 1, wherein successive macro block lines compose a group of macro block lines, and the first macro block line is the last line of the group of macro block lines.

4. The image encoding device according to claim 3, wherein the output unit transmits the encoded data to an image decoding device which decodes the encoded data and displays video data, and a period during which the group of macro block lines is displayed is previously fixed in the image decoding device.

5. The image encoding device according to claim 1, wherein when the predetermined number is "K", the number of bits of the smallest unit of output is "A", the number of macro blocks which compose the macro block line is "X", and the maximum number of macro blocks which are required for generation of 1-bit encoded data is "B", the predetermined number, "K", is represented by the following equation, <Equation 1>;

$$K = X - (A \times B) + 1 \qquad \text{<Equation 1>.}$$

* * * * *